Jan. 1, 1957  C. KLINGSPOR  2,775,854

CUTTING OR POLISHING DISK

Filed Feb. 8, 1954

INVENTOR

*Carl Klingspor*

BY

ATTORNEYS

United States Patent Office 2,775,854
Patented Jan. 1, 1957

2,775,854

CUTTING OR POLISHING DISK

Carl Klingspor, New York, N. Y.

Application February 8, 1954, Serial No. 408,638

4 Claims. (Cl. 51—206)

This invention relates to a wheel used for grinding, polishing, cutting, or separation and refers more particularly to a grinding wheel made by forming and pressing and consisting of a single disk-shaped body having cutting elements, and a binder of artificial resin.

Disks of this type begin their cutting operation at the outer circumference thereof. On the other hand, the cutting or polishing operation is carried out essentially upon the side edges and the side surfaces of these disks.

An object of the present invention is the provision of polishing disks which will cut freely and which will not become jammed in the course of the cutting operation.

Another object is the provision of a grinding disk particularly suitable for cutting or separation purposes which is made of one piece, and wherein the cutting elements are pressed, along with a binder of artificial resin, into form pieces such as wheels or disks.

Yet another object of the present invention is the provision of a disk the surfaces of which are so formed that the disk will cut freely without the danger that it will become jammed.

It should be noted in this connection that in the course of the cutting or separating operation a substantial amount of heat develops in the material which is being cut by the disk, or wheel, as the disk penetrates into a material. In the case of iron, steel, and various other metals temperatures ranging between 40° C. and 100° C. suffice to provide after a short time such an expansion of the material that the cut produced by the cutting wheel is substantially narrowed and begins to exert a side pressure upon the cutting disk. This side pressure increases with an increase in the penetration of the disk and with the length of time of the cutting operation. Therefore, in the course of the cutting operation considerably larger forces are expended in overcoming the side pressure of the material to be cut than are consumed in the cutting itself. When the heat becomes too great, a burning of the disk takes place at its periphery or the disk loses its shape. Thus, a further and important object of the present invention is to eliminate these drawbacks and to produce a disk or wheel which is not subjected to side pressure in the course of the cutting operation.

Yet another object of the present invention is the provision of a cutting disk or wheel which is not subjected to side pressure of the material being cut and which can be effectively applied for cutting large sections of the material.

Other objects of the present invention will become apparent in the course of the following specification.

In accomplishing the object of the present invention it was found desirable to provide a grinding or cutting wheel or disk which is so formed that as a result of this form the cut produced by the disk or wheel is further ground and increased in the proportion, depending upon the strength of the disk or wheel. Consequently, while the disk penetrates with its periphery into the material being cut, the disk also grinds the side surfaces of the material at the cut in order to free itself from the side pressure of the material and to prevent the development of heat in the material.

The disk constituting the subject of the present invention is so constructed that while its strength is the same at each section of its circumference, nevertheless in the course of the grinding operation a wider cut is produced than the thickness of the disk, the extent of the width of the actual cut depending upon the form of the disk.

According to a preferred embodiment of the inventive idea the grinding or cutting disk is made of one piece consisting of two or more segments of the same thickness which are disposed symmetrically to each other in relation to the center of the disk and which are provided with side surfaces extending parallel to each other and to the disk. Thus, one portion of the disk may be described as being shifted to one side in relation to the central plane of the disk while another portion is shifted proportionally to the other side, the arrangement being such that the disk is completely balanced. Obviously, the shifted portions may constitute one-half of the disk, or the disk may be divided into any suitable number of the shifted portions.

The invention will appear more clearly from the following detailed description when taken in connection with the accompanying drawing showing, by way of example, preferred embodiments of the inventive idea.

Figure 1:
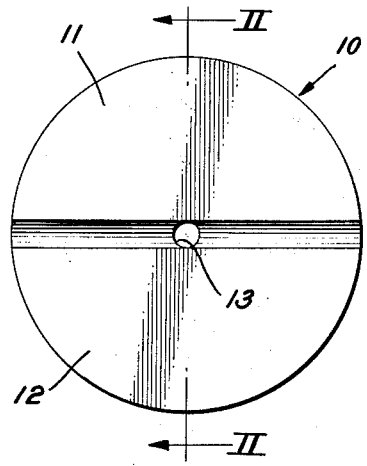
Figure 1 is a side view of a grinding and cutting disk constructed in accordance with the principles of the present invention.
Figure 2:
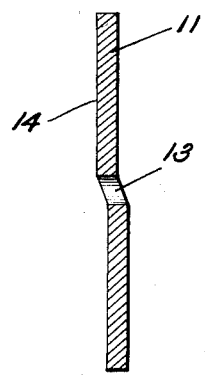
Figure 2 is a section along the line II—II looking in the direction of the arrows.

The grinding and cutting disk 10 shown in Figures 1 and 2 includes two segments 11 and 12, each of which constitutes one half of the disk. The segment 11 is shifted to the left (looking in the direction of Figure 2) in relation to the central plane of the disk while the segment 12 is shifted in the opposite direction and to the same extent. This shifting of the segments 11 and 12 may be also described as taking place in relation to the central opening 13 provided in the disk 10. It is apparent that if the disk 10 is placed upon a flat surface (not shown) then one surface of one of the portions 11 or 12, such as the surface 14 of the portion 11, will lie flat upon the surface while the portion 12 will then extend at a distance from that surface and parallel thereto.

The disk 10 thus has a right-hand portion and a left-hand portion, 11 or 12, respectively. These two portions will both participate in the cutting operation and in the course of the cutting will not affect the proper rotation of the disk or shift it out of balance.

Figure 3:
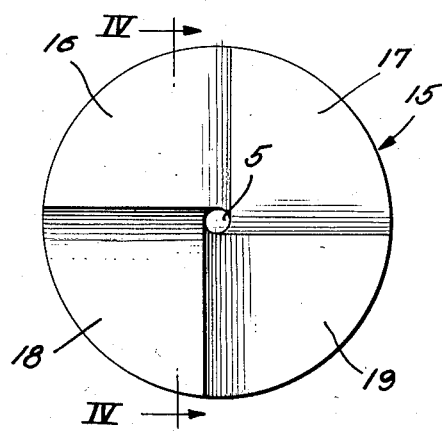
Figure 3 is a side view of a somewhat differently constructed disk.
Figure 4:
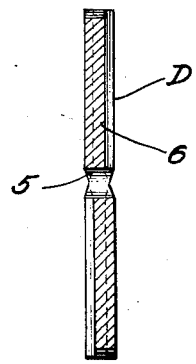
Figure 4 is a section along the line IV—IV of Figure 3, looking in the direction of the arrows.

It is apparent that instead of dividing a disk, or wheel, into two sections 11 and 12, the number of these sections may be increased to four, six, or more. Figures 3 and 4 illustrate a disk 15 provided with four sections 16, 17, 18, 19. It is apparent that the disk segments 16 and 19 are shifted in one direction while the segments 17 and 18 are shifted in the opposite direction. In other words, the segments, or sectors, 16 to 18 project alternately, uniformly and symmetrically so that the center of gravity of the wheel and the balancing of its masses are not affected.

Practical experience has shown that a disk having an outer diameter of 300 mm. may be rotated with a circumferential speed of about 100 mm. per second, and the disk will then cut without exerting any substantial pressure and will form a cut of the same width by the same cutting or grinding of the side walls of the cut without there being any danger that the cut will contract. It is advantageous for this purpose to make the disk or wheel of a material which is sufficiently elastic so that the disk will not break at the sides by the centrifugal force, even when it is rotated at the above-mentioned high speed.

The following specific example of the manufacture of a cutting disk is given by way of example only:

As the initial material an ordinary cutting disk may be used having, by way of example, a diameter of 300 mm. and a thickness of 5 mm. and consisting of band fibres, such material being known under the trade marks "Bakelite" and "Kronenflex." In order to shape this disk into the disk of the present invention shown in Figures 1 and 2, the operator first delineates the segment 11 and then cuts off uniformly from this portion of the disk a thickness of 2 millimetres. Then the disk is turned on its other side and from the remaining portion of the disk, which is the segment 12, a thickness of 2 millimetres is removed from the opposite side. In the course of this work it is necessary to make sure that the finished disk 10 has throughout a thickness of 3 mms. and that there is no sharp change from one segment to another. This can be conveniently attained if the disk 10 is manufactured in a form. It is thus apparent that the individual segments 11 and 12 of the disk 10 will grind alternately the side walls of the cut.

It is further apparent that the described methods of manufacture and the illustrated forms of the disk are subject to many variations and modifications without exceeding the scope or intent of the present invention. All such variations and modifications are to be considered within the scope of the present invention.

What is claimed is:

1. A grinding or polishing wheel of hard wear-resisting material, said wheel having the same thickness along all its radii, said wheel having equal sectors which are integral therewith and which are offset alternately in opposite directions from the central plane of the wheel, each of said sectors having opposed side surfaces constituting the cutting surfaces of the wheel, and inclined portions interconnecting said sectors, said inclined portions having the same thickness as said sectors.

2. A wheel according to claim 1, wherein said projections are displaced with respect to each other by such distances that a cut through the main plane of rotation is everywhere surrounded by the material of the wheel.

3. A cutting and polishing disk, in accordance with claim 1, wherein said sectors are uniformly, symmetrically and alternately offset in relation to the central plane of the wheel, whereby equal depressions and projections having parallel surfaces are formed on opposite sides of the body.

4. A wheel in accordance with claim 3, wherein said body consists of substantially elastic cutting material.

References Cited in the file of this patent
UNITED STATES PATENTS

| | | |
|---|---|---|
| 539,464 | Whitaker | May 31, 1895 |
| 875,935 | Landis | Jan. 7, 1908 |
| 927,164 | Puffer | July 6, 1909 |
| 1,912,069 | Doermann | May 30, 1933 |
| 2,027,132 | Webster | Jan. 7, 1936 |
| 2,036,903 | Webster | Apr. 7, 1936 |
| 2,457,516 | Allison | Dec. 28, 1948 |
| 2,589,661 | Belcher | Mar. 18, 1952 |
| 2,616,229 | Allison | Nov. 4, 1952 |